United States Patent
Ku et al.

(10) Patent No.: US 10,297,916 B2
(45) Date of Patent: May 21, 2019

(54) ANTENNA STRUCTURE

(71) Applicant: Wistron NeWeb Corp., Hsinchu (TW)

(72) Inventors: Kuang-Yuan Ku, Hsinchu (TW); Tsun-Che Huang, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 18 days.

(21) Appl. No.: 15/792,691

(22) Filed: Oct. 24, 2017

(65) Prior Publication Data

US 2018/0183147 A1    Jun. 28, 2018

(30) Foreign Application Priority Data

Dec. 27, 2016    (TW) .............................. 105219746 U (51) Int. Cl.

| | |
|---|---|
| *H01Q 5/30* | (2015.01) |
| *H01Q 1/24* | (2006.01) |
| *H01Q 9/42* | (2006.01) |
| *H01Q 5/50* | (2015.01) |
| *H04M 1/02* | (2006.01) |
| *H01Q 21/08* | (2006.01) |
| *H01Q 5/20* | (2015.01) |

(52) U.S. Cl.
CPC .................. *H01Q 5/30* (2015.01); *H01Q 1/24* (2013.01); *H01Q 1/243* (2013.01); *H01Q 5/50* (2015.01); *H01Q 9/42* (2013.01); *H01Q 21/08* (2013.01); *H04M 1/026* (2013.01); *H04M 1/0274* (2013.01); *H01Q 5/20* (2015.01)

(58) Field of Classification Search
CPC ............ H01Q 5/30; H01Q 1/243; H01Q 9/26; H01Q 21/08; H01Q 9/42; H01Q 5/50; H01Q 1/24; H04M 1/026
USPC ......................................................... 343/905
See application file for complete search history.

(56) References Cited

U.S. PATENT DOCUMENTS

| | | | |
|---|---|---|---|
| 2011/0122038 A1* | 5/2011 | Koide ................. | H01Q 9/0407 343/803 |
| 2014/0218246 A1* | 8/2014 | Ishizuka ............... | H01Q 5/335 343/749 |

* cited by examiner

*Primary Examiner* — Hai V Tran (57) ABSTRACT

An antenna structure includes a dielectric substrate, a first radiation element, a second radiation element, a third radiation element, a fourth radiation element, a fifth radiation element, and a sixth radiation element. The dielectric substrate has an upper surface and a lower surface. The first radiation element, the second radiation element, the fourth radiation element, and the fifth radiation element are disposed on the upper surface of the dielectric substrate. The third radiation element and the sixth radiation element are disposed on the lower surface of the dielectric substrate. A positive feeding point is positioned at an end of the first radiation element. A negative feeding point is positioned at an end of the fourth radiation element. The third radiation element couples the first radiation element to the second radiation element. The sixth radiation element couples the fourth radiation element to the fifth radiation element.

18 Claims, 9 Drawing Sheets

ANTENNA STRUCTURE

CROSS REFERENCE TO RELATED APPLICATIONS

This Application claims priority of Taiwan Patent Application No. 105219746 filed on Dec. 27, 2016, the entirety of which is incorporated by reference herein.

BACKGROUND OF THE INVENTION

Field of the Invention

The disclosure generally relates to an antenna structure, and more particularly, to a wideband antenna structure.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi and Bluetooth systems and using frequency bands of 2.4 GHz, 5.2 GHz, and 5.8 GHz.

Antennas are indispensable elements in the field of wireless communication. If an antenna for signal reception or transmission has insufficient bandwidth, the communication quality of the corresponding mobile device will tend to be degraded. Accordingly, it has become a critical challenge for antenna designers to design a small-size, wideband antenna element.

BRIEF SUMMARY OF THE INVENTION

In an exemplary embodiment, the disclosure is directed to an antenna structure including a dielectric substrate, a first radiation element, a second radiation element, a third radiation element, a fourth radiation element, a fifth radiation element, and a sixth radiation element. The dielectric substrate has an upper surface and a lower surface. The first radiation element has a first end and a second end, and is disposed on the upper surface of the dielectric substrate. A positive feeding point is positioned at the first end of the first radiation element. The second radiation element has a first end and a second end, and is disposed on the upper surface of the dielectric substrate. The second end of the second radiation element faces the second end of the first radiation element. The third radiation element has a first end and a second end, and is disposed on the lower surface of the dielectric substrate. The first end of the third radiation element is coupled to the first end of the first radiation element, and the second end of the third radiation element is coupled to the first end of the second radiation element. The fourth radiation element has a first end and a second end, and is disposed on the upper surface of the dielectric substrate. A negative feeding point is positioned at the first end of the fourth radiation element. The fifth radiation element has a first end and a second end, and is disposed on the upper surface of the dielectric substrate. The second end of the fifth radiation element faces the second end of the fourth radiation element. The sixth radiation element has a first end and a second end, and is disposed on the lower surface of the dielectric substrate. The first end of the sixth radiation element is coupled to the first end of the fourth radiation element, and the second end of the sixth radiation element is coupled to the first end of the fifth radiation element.

In another exemplary embodiment, the disclosure is directed to an antenna structure including a dielectric substrate, a first radiation element, a second radiation element, a third radiation element, and a ground plane. The dielectric substrate has an upper surface and a lower surface. The first radiation element has a first end and a second end, and is disposed on the upper surface of the dielectric substrate. A positive feeding point is positioned at the first end of the first radiation element. The second radiation element has a first end and a second end, and is disposed on the upper surface of the dielectric substrate. The second end of the second radiation element faces the second end of the first radiation element. The third radiation element has a first end and a second end, and is disposed on the lower surface of the dielectric substrate. The first end of the third radiation element is coupled to the first end of the first radiation element, and the second end of the third radiation element is coupled to the first end of the second radiation element. The ground plane is disposed adjacent to the dielectric substrate. A negative feeding point is positioned at the ground plane.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

Figure 1A:
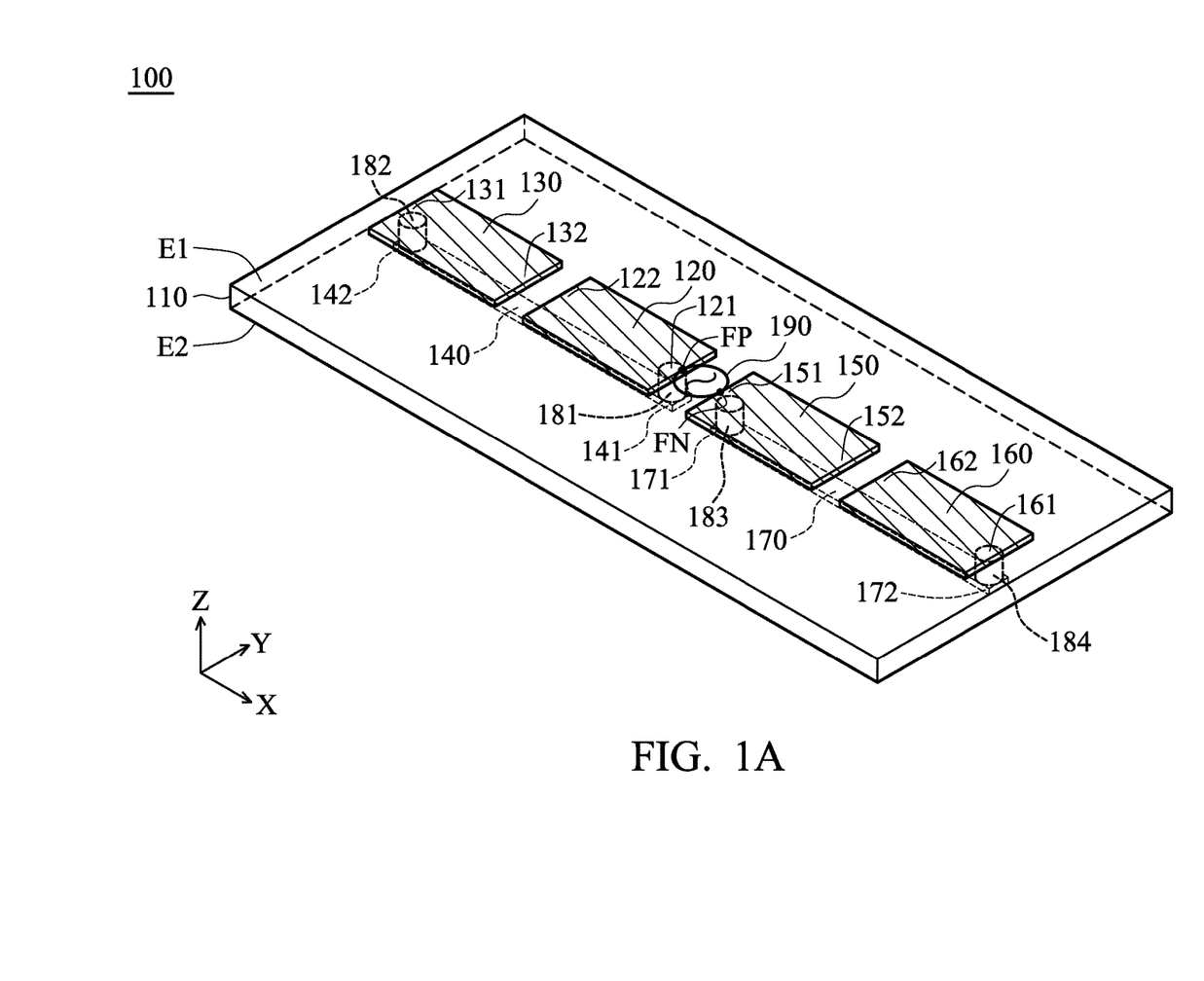
FIG. 1A is a perspective view of an antenna structure according to an embodiment of the invention.
Figure 1B:
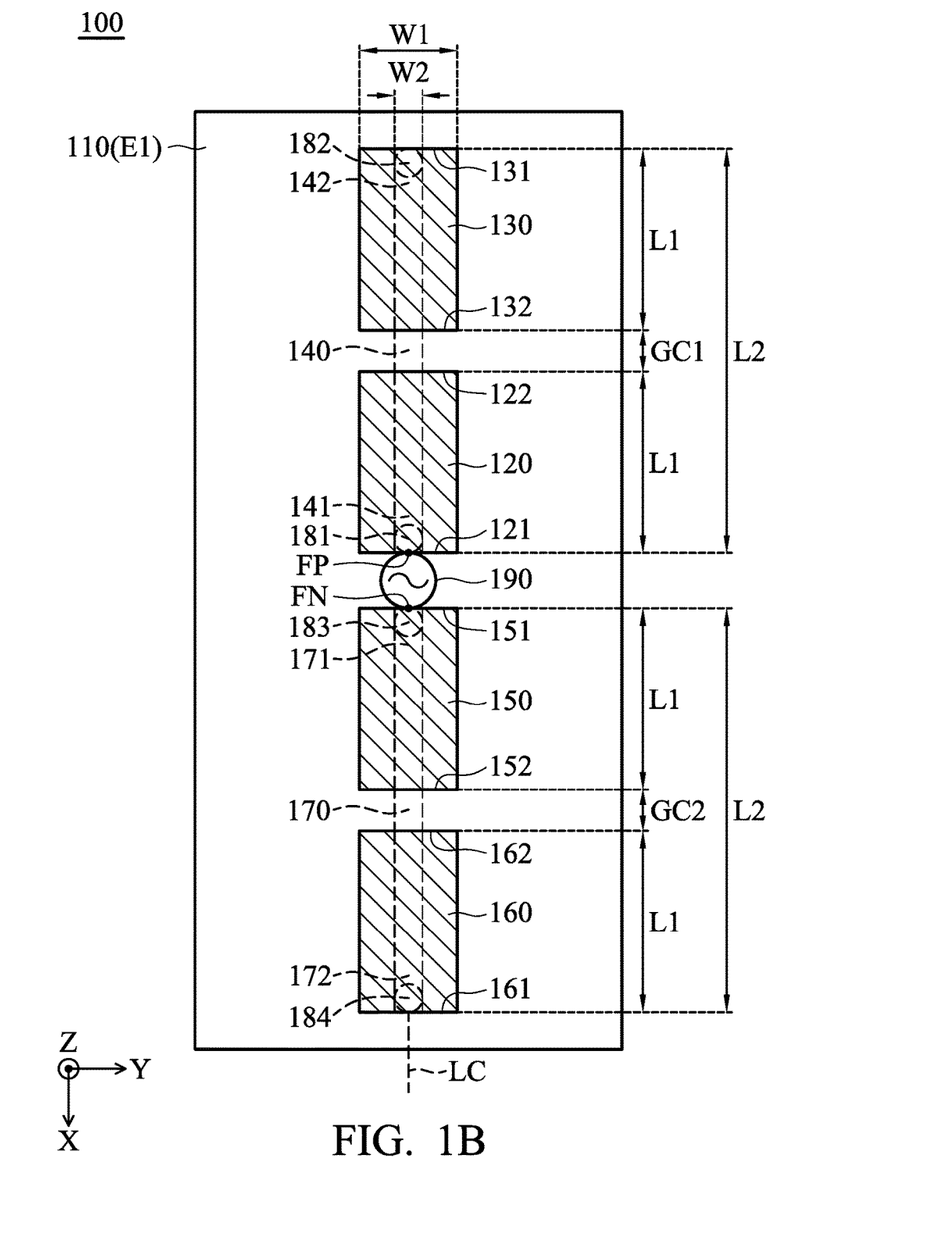
FIG. 1B is a top view of an antenna structure according to an embodiment of the invention.
Figure 1C:
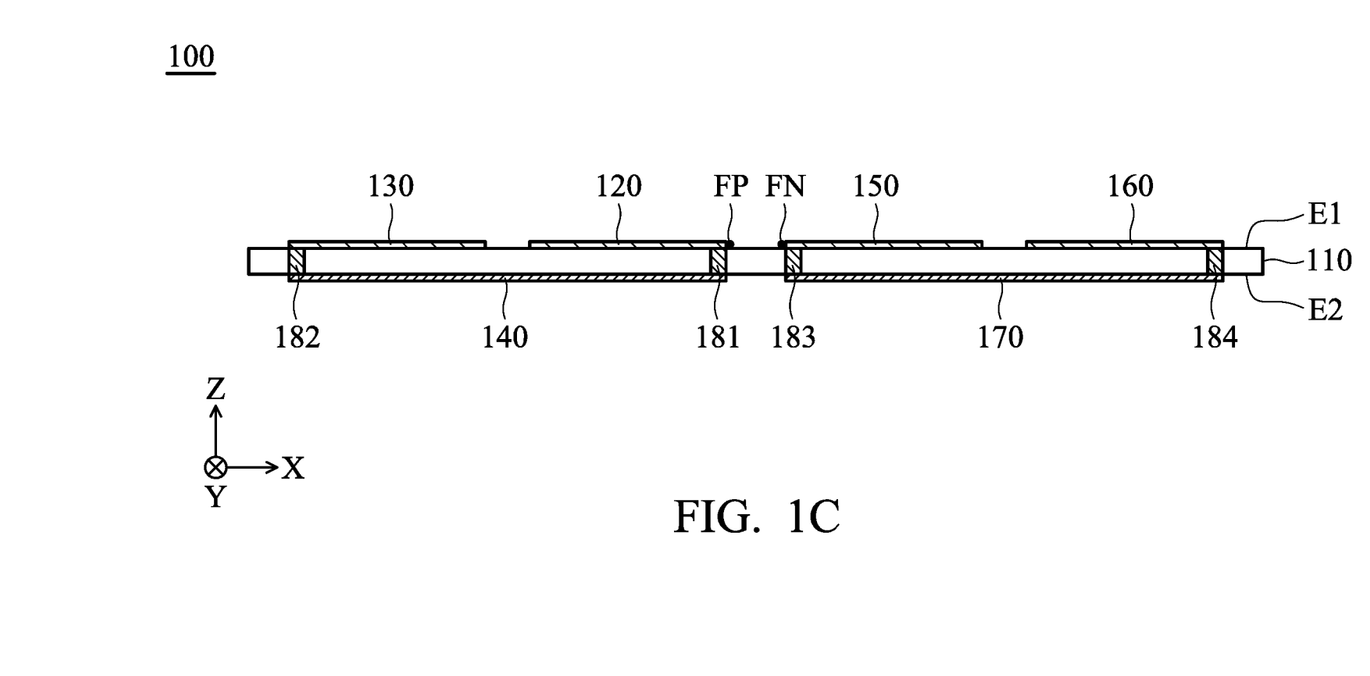
FIG. 1C is a sectional view of an antenna structure according to an embodiment of the invention.

FIG. 1A is a perspective view of an antenna structure 100 according to an embodiment of the invention. FIG. 1B is a top view of the antenna structure 100 according to an embodiment of the invention. FIG. 1C is a sectional view of the antenna structure 100 according to an embodiment of the invention (along a sectional line LC of FIG. 1B). Please refer to FIG. 1A, FIG. 1B, and FIG. 1C together. The antenna structure 100 may be applied in a mobile device, such as a smart phone, a tablet computer, or a notebook computer. As shown in FIG. 1A, FIG. 1B, and FIG. 1C, the antenna structure 100 at least includes a dielectric substrate 110, a first radiation element 120, a second radiation element 130, a third radiation element 140, a fourth radiation element 150, a fifth radiation element 160, and a sixth radiation element 170. The dielectric substrate 110 may be an FR4 (Flame Retardant 4) substrate or a system circuit board. The first radiation element 120, the second radiation element 130, the third radiation element 140, the fourth radiation element 150, the fifth radiation element 160, and the sixth radiation element 170 may be made of metal materials, such as copper, silver, aluminum, iron, or their alloys.

The dielectric substrate 110 has an upper surface E1 and a lower surface E2. The first radiation element 120, the second radiation element 130, the fourth radiation element 150, and the fifth radiation element 160 are all disposed on the upper surface E1 of the dielectric substrate 110. The third radiation element 140 and the sixth radiation element 170 are both disposed on the lower surface E2 of the dielectric substrate 110. Each of the first radiation element 120, the second radiation element 130, the fourth radiation element 150, and the fifth radiation element 160 may substantially have a rectangular shape. Each of the third radiation element 140 and the sixth radiation element 170 may substantially have a straight-line shape. The first radiation element 120 has a first end 121 and a second end 122. A positive feeding point FP is positioned at the first end 121 of the first radiation element 120. The second end 122 of the first radiation element 120 is an open end. The second radiation element 130 has a first end 131 and a second end 132. The second end 132 of the second radiation element 130 is an open end which faces the second end 122 of the first radiation element 120. A first coupling gap GC1 may be formed between the second end 132 of the second radiation element 130 and the second end 122 of the first radiation element 120. The third radiation element 140 has a first end 141 and a second end 142. The first end 141 of the third radiation element 140 is coupled to the first end 121 of the first radiation element 120. The second end 142 of the third radiation element 140 is coupled to the first end 131 of the second radiation element 130. The fourth radiation element 150 has a first end 151 and a second end 152. A negative feeding point FN is positioned at the first end 151 of the fourth radiation element 150. The second end 152 of the fourth radiation element 150 is an open end. The fifth radiation element 160 has a first end 161 and a second end 162. The second end 162 of the fifth radiation element 160 is an open end which faces the second end 152 of the fourth radiation element 150. A second coupling gap GC2 may be formed between the second end 162 of the fifth radiation element 160 and the second end 152 of the fourth radiation element 150. The sixth radiation element 170 has a first end 171 and a second end 172. The first end 171 of the sixth radiation element 170 is coupled to the first end 151 of the fourth radiation element 150. The second end 172 of the sixth radiation element 170 is coupled to the first end 161 of the fifth radiation element 160. The antenna structure 100 may further include a signal source 190. The signal source 190 has a positive electrode and a negative electrode, and is configured to generate an RF (Radio Frequency) signal. The positive electrode of the signal source 190 is coupled to the positive feeding point FP, and the negative electrode of the signal source 190 is coupled to the negative feeding point FN. The antenna structure 100 may be excited by the RF signal from the signal source 190.

In some embodiments, the antenna structure 100 further includes a first via element 181, a second via element 182, a third via element 183, and a fourth via element 184. The first via element 181, the second via element 182, the third via element 183, and the fourth via element 184 are all formed in the dielectric substrate 110, and they are made of metal materials, such as copper, silver, aluminum, iron, or their alloys. Each via element may be substantially a cylindrical pillar or a quadrangular pillar, but it is not limited thereto. The first via element 181 is coupled between the first end 121 of the first radiation element 120 and the first end 141 of the third radiation element 140. The second via element 182 is coupled between the first end 131 of the second radiation element 130 and the second end 142 of the third radiation element 140. The third via element 183 is coupled between the first end 151 of the fourth radiation element 150 and the first end 171 of the sixth radiation element 170. The fourth via element 184 is coupled between the first end 161 of the fifth radiation element 160 and the second end 172 of the sixth radiation element 170.

According to practical measurements, the antenna structure 100 is capable of covering a low-frequency band and a high-frequency band. The aforementioned low-frequency band may range from about 2400 MHz to about 2484 MHz. The aforementioned high-frequency band may range from about 5150 MHz to about 5850 MHz. Accordingly, the antenna structure 100 can support at least the dual-band operation of WLAN (Wireless Local Area Networks) 2.4 GHz/5 GHz.

The operation theory of the antenna structure 100 may be as follows. The aforementioned low-frequency band is mainly generated by exciting the first via element 181, the third radiation element 140, the second via element 182, and the second radiation element 130. In addition, the aforementioned low-frequency band is also generated by exciting the third via element 183, the sixth radiation element 170, the fourth via element 184, and the fifth radiation element 160. The aforementioned high-frequency band is mainly generated by exciting the first radiation element 120 and the fourth radiation element 150. The mutual coupling effect is induced between the second radiation element 130 and the first radiation element 120, and is also induced between the fifth radiation element 160 and the fourth radiation element 150, thereby increasing the operation bandwidth of the aforementioned high-frequency band.

The element sizes of the antenna structure 100 may be as follows. The length L1 of each of the first radiation element 120 and the fourth radiation element 150 may be substantially equal to 0.25 wavelength (λ/4) of the high-frequency band. The length L2 of each of the third radiation element 140 and the sixth radiation element 170 may be smaller than 0.25 wavelength (λ/4) of the low-frequency band. The total length from the first feeding point FP through the first via element 181, the third radiation element 140 and the second via element 182 to the second end 132 of the second radiation element 130 may be substantially equal to 0.25 wavelength (λ/4) of the low-frequency band (such a total length may be approximately equal to the total length of the third radiation element 140 and the second radiation element 130 because the lengths of the via elements 181 and 182 are very small). The total length from the negative feeding point FN through the third via element 183, the sixth radiation element 170 and the fourth via element 184 to the second end 162 of the fifth radiation element 160 may be substantially equal to 0.25 wavelength (λ/4) of the low-frequency band (such a total length may be approximately equal to the total length of the sixth radiation element 170 and the fifth radiation element 160 because the lengths of the via elements 183 and 184 are very small). Each of the first radiation element 120, the second radiation element 130, the fourth radiation element 150, and the fifth radiation element 160 has a width W1. Each of the third radiation element 140 and the sixth radiation element 170 has a width W2. The aforementioned width W1 may be greater than or equal to the aforementioned width W2. For example, the aforementioned width W1 may be at least 2 to 3 times the aforementioned width W2. The width of each of the first coupling gap GC1 and the second coupling gap GC2 may be smaller than 5 mm. The above ranges of element sizes are calculated and obtained according to many experiment results, and they help to optimize the impedance matching and the operation frequency band of the antenna structure 100.

Figure 2:
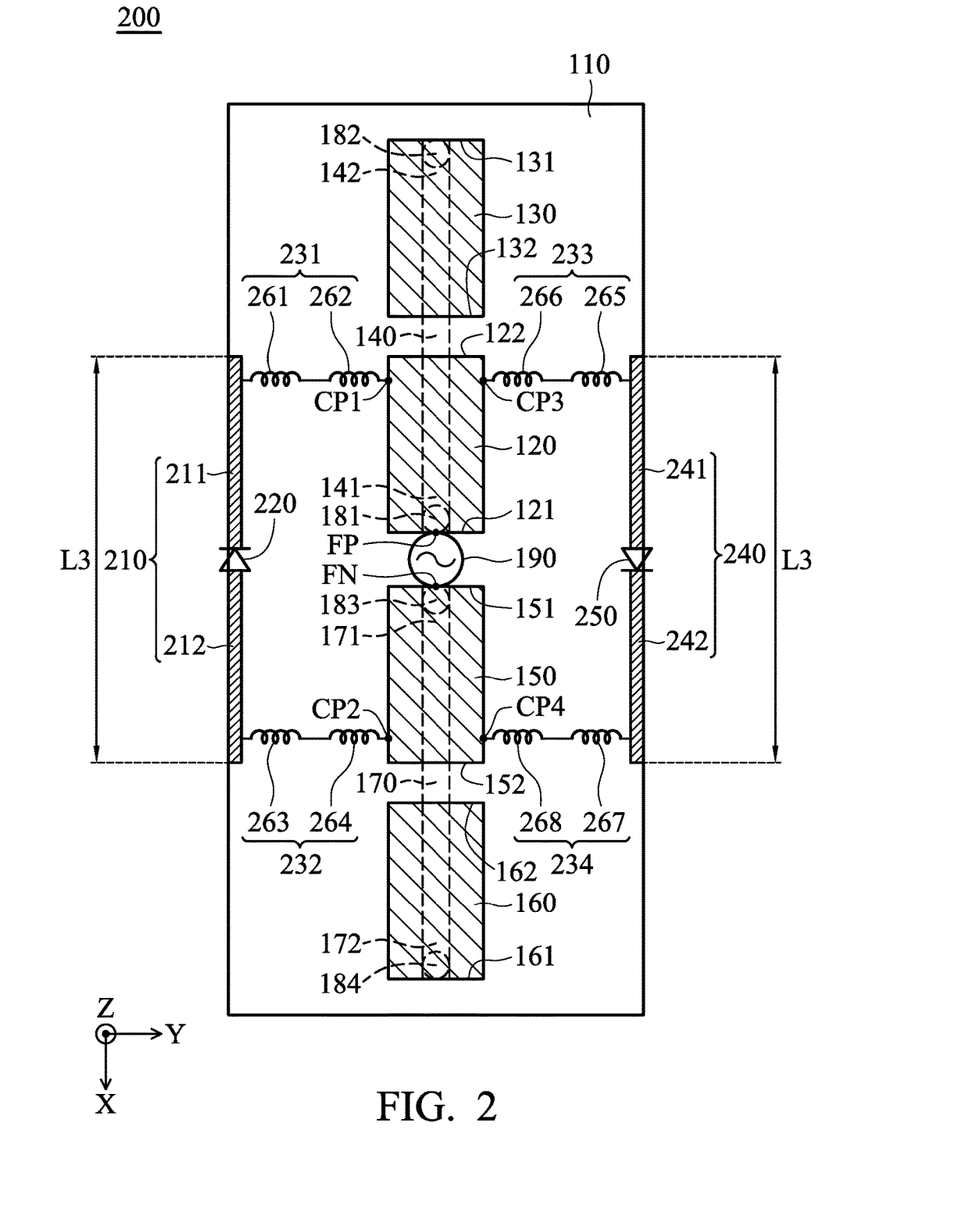
FIG. 2 is a top view of an antenna structure according to an embodiment of the invention.

FIG. 2 is a top view of the antenna structure 200 according to an embodiment of the invention. FIG. 2 is similar to FIG. 1A, FIG. 1B, and FIG. 1C. The difference between them is that the antenna structure 200 of FIG. 2 further includes a first reflector 210, a first diode 220, a first inductor 231, a second inductor 232, a second reflector 240, a second diode 250, a third inductor 233, and a fourth inductor 234. Each of the first reflector 210 and the second reflector 240 may be a straight-line conductor for selectively reflecting the electromagnetic waves in the aforementioned high-frequency band. The total length L3 of each of the first reflector 210 and the second reflector 240 may be greater than or equal to 0.5 wavelength (λ/2) of the aforementioned high-frequency band. The first reflector 210 and the second reflector 240 may be disposed at two opposite sides of the antenna structure 200, respectively. The first reflector 210 and the second reflector 240 may be substantially parallel to the extension direction from the first radiation element 120 to the second radiation element 130, and also substantially parallel to the extension direction from the fourth radiation element 150 to the fifth radiation element 160. In addition to the RF signal, the signal source 190 can further generate a DC (Direct Current) control signal for controlling the switching states of the first diode 220 and the second diodes 250. The first inductor 231, the second inductor 232, the third inductor 233, and the fourth inductor 234 are configured to block the RF signal and pass only the DC control signal. For example, each of the first inductor 231, the second inductor 232, the third inductor 233, and the fourth inductor 234 may have an inductance from about 1 nH to about 10 nH.

The above elements of the antenna structure 200 may be arranged as follows. The first reflector 210 includes a first portion 211 and a second portion 212. The first diode 220 is coupled in series between the first portion 211 and the second portion 212 of the first reflector 210. The first diode 220 is selectively turned on or off according to the DC control signal of the signal source 190. The first inductor 231 is coupled between the first portion 211 of the first reflector 210 and a first connection point CP1. The first connection point CP1 may be positioned at the first radiation element 120, the second radiation element 130, or the third radiation element 140. In some embodiments, the first inductor 231 includes a first sub-inductor 261 and a second sub-inductor 262 which are independent of each other and are coupled in series. The first sub-inductor 261 is adjacent to the first portion 211 of the first inductor 210. The second sub-inductor 262 is adjacent to the first connection point CP1. The second inductor 232 is coupled between the second portion 212 of the first reflector 210 and a second connection point CP2. The second connection point CP2 may be positioned at the fourth radiation element 150, the fifth radiation element 160, or the sixth radiation element 170. In some embodiments, the second inductor 232 includes a third sub-inductor 263 and a fourth sub-inductor 264 which are independent of each other and are coupled in series. The third sub-inductor 263 is adjacent to the second portion 212 of the first inductor 210. The fourth sub-inductor 264 is adjacent to the second connection point CP2. The second reflector 240 includes a first portion 241 and a second portion 242. The second diode 250 is coupled in series between the first portion 241 and the second portion 242 of the second reflector 240. The second diode 250 is selectively turned on or off according to the DC control signal of the signal source 190. The third inductor 233 is coupled between the first portion 241 of the second reflector 240 and a third connection point CP3. The third connection point CP3 may be positioned at the first radiation element 120, the second radiation element 130, or the third radiation element 140. In some embodiments, the third inductor 233 includes a fifth sub-inductor 265 and a sixth sub-inductor 266 which are independent of each other and are coupled in series. The fifth sub-inductor 265 is adjacent to the first portion 241 of the second inductor 240. The sixth sub-inductor 266 is adjacent to the third connection point CP3. The fourth inductor 234 is coupled between the second portion 242 of the second reflector 240 and a fourth connection point CP4. The fourth connection point CP4 may be positioned at the fourth radiation element 150, the fifth radiation element 160, or the sixth radiation element 170. In some embodiments, the fourth inductor 234 includes a seventh sub-inductor 267 and an eighth sub-inductor 268 which are independent of each other and are coupled in series. The seventh sub-inductor 267 is adjacent to the second portion 242 of the second inductor 240. The eighth sub-inductor 268 is adjacent to the fourth connection point CP4. According to the practical measurement, the above design of each inductor including two independent sub-inductors can further enhance the function of blocking the RF signal.

For example, the DC control signal of the signal source 190 may have three voltage levels including +3V, 0V, and −3V. When the DC control signal has a voltage level of +3V, the first diode 220 is turned off so as to disable the first reflector 210, and the second diode 250 is turned on so as to enable the second reflector 240. When the DC control signal has a voltage level of 0V, the first diode 220 and the second diode 250 are both turned off so as to disable the first reflector 210 and the second reflector 240 at the same time.

When the DC control signal has a voltage level of −3V, the first diode 220 is turned on so as to enable the first reflector 210, and the second diode 250 is turned off so as to disable the second reflector 240. That is, the first diode 220 and the second diode 250 may be both turned off, or, alternatively, be turned on one at a time.

Figure 3A:
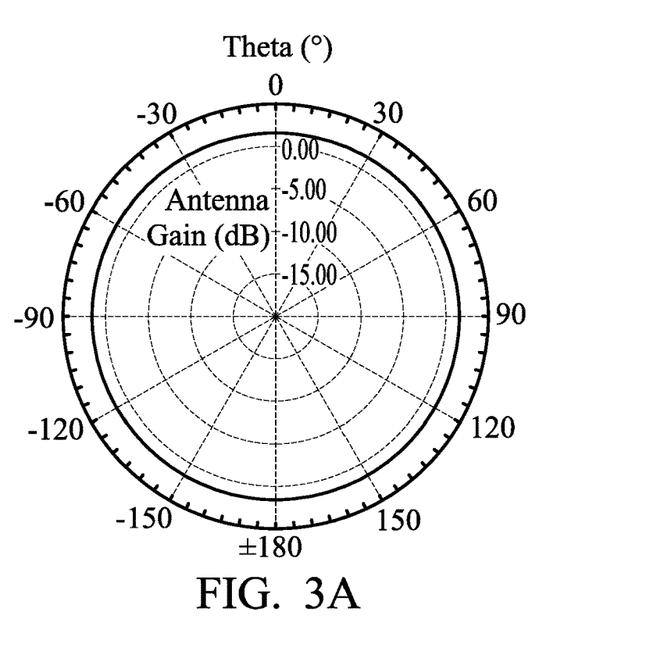
FIG. 3A is a radiation pattern of an antenna structure according to an embodiment of the invention.
Figure 3B:
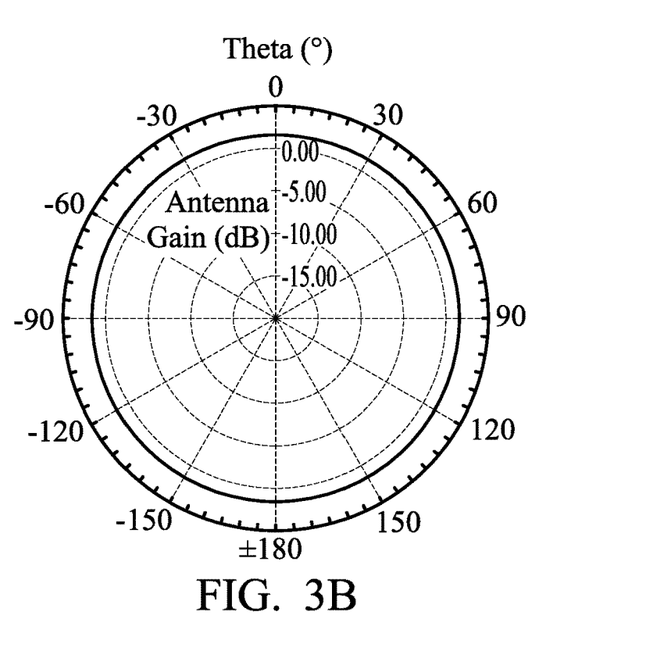
FIG. 3B is a radiation pattern of an antenna structure according to an embodiment of the invention.

FIG. 3A is a radiation pattern of the antenna structure 200 according to an embodiment of the invention, which illustrates the antenna gain (dBi) measured on the YZ plane. In the embodiment of FIG. 3A, the antenna structure 200 operates in the aforementioned low-frequency band, and both the first diode 220 and the second diode 250 are turned off. FIG. 3B is a radiation pattern of the antenna structure 200 according to an embodiment of the invention, which illustrates the antenna gain (dBi) measured on the YZ plane. In the embodiment of FIG. 3B, the antenna structure 200 operates in the aforementioned low-frequency band, and one of the first diode 220 and the second diode 250 is turned on, but the other of the first diode 220 and the second diode 250 is turned off. According to the measurement of FIG. 3A and FIG. 3B, the antenna structure 200 has an omnidirectional radiation pattern in the aforementioned low-frequency band, and it is not affected by the enabling and disabling states of the first reflector 210 and the second reflector 240.

Figure 4A:
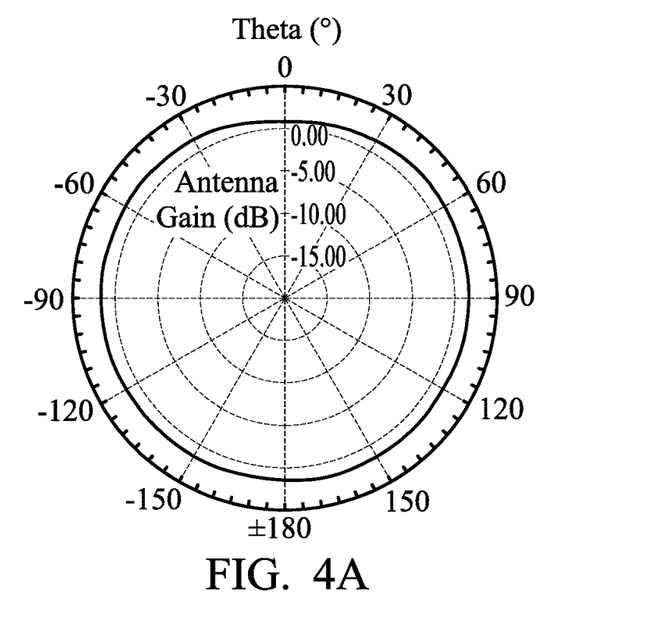
FIG. 4A is a radiation pattern of an antenna structure according to an embodiment of the invention.
Figure 4B:
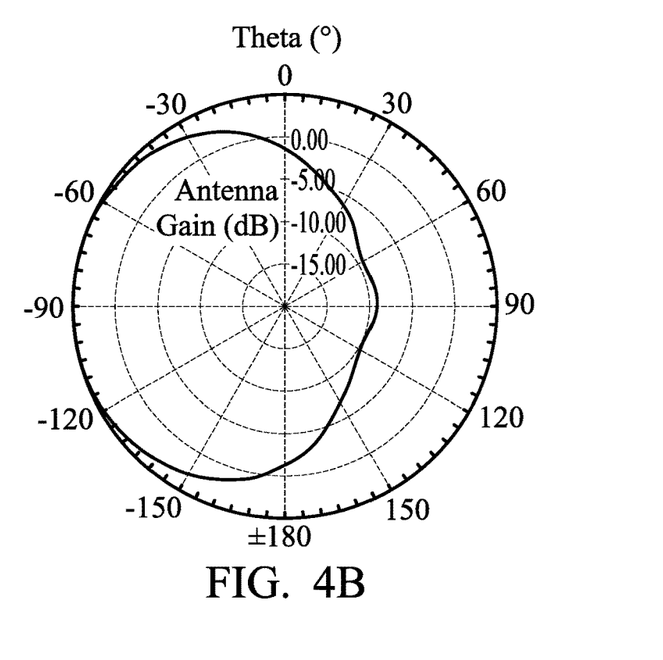
FIG. 4B is a radiation pattern of an antenna structure according to an embodiment of the invention.
Figure 4C:
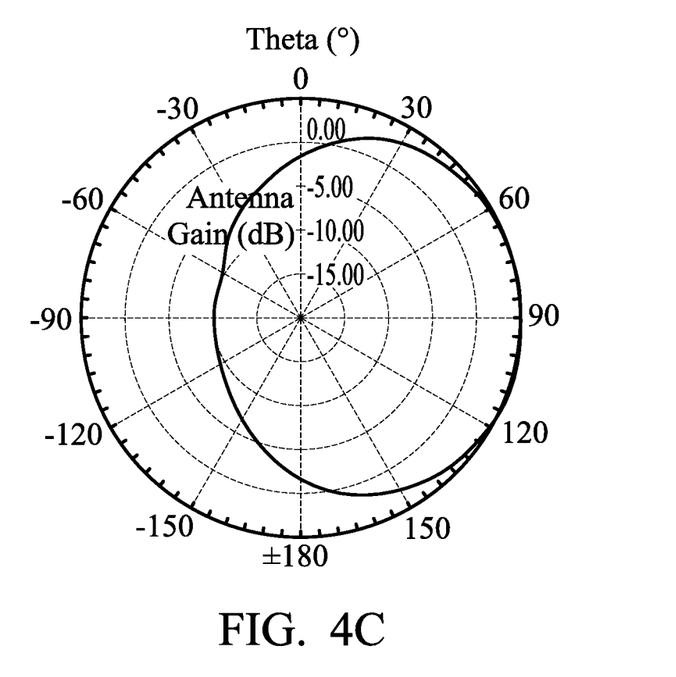
FIG. 4C is a radiation pattern of an antenna structure according to an embodiment of the invention.

FIG. 4A is a radiation pattern of the antenna structure 200 according to an embodiment of the invention, which illustrates the antenna gain (dBi) measured on the YZ plane. In the embodiment of FIG. 4A, the antenna structure 200 operates in the aforementioned high-frequency band, and both the first diode 220 and the second diode 250 are turned off. Since no reflector is enabled, the antenna structure 200 has an omnidirectional radiation pattern. FIG. 4B is a radiation pattern of the antenna structure 200 according to an embodiment of the invention, which illustrates the antenna gain (dBi) measured on the YZ plane. In the embodiment of FIG. 4B, the antenna structure 200 operates in the aforementioned high-frequency band, and the first diode 220 is turned off, and the second diode 250 is turned on. Because only the second reflector 240 is enabled, the main beam of the antenna structure 200 is reflected and oriented to the direction of the −Y axis. FIG. 4C is a radiation pattern of the antenna structure 200 according to an embodiment of the invention, which illustrates the antenna gain (dBi) measured on the YZ plane. In the embodiment of FIG. 4C, the antenna structure 200 operates in the aforementioned high-frequency band, and the first diode 220 is turned on, and the second diode 250 is turned off. Because only the first reflector 210 is enabled, the main beam of the antenna structure 200 is reflected and oriented to the direction of the +Y axis. According to the measurement of FIG. 4A, FIG. 4B, and FIG. 4C, the antenna structure 200 has an omnidirectional or directional radiation pattern in the aforementioned high-frequency band, and it is determined by the enabling and disabling states of the first reflector 210 and the second reflector 240.

Figure 5:
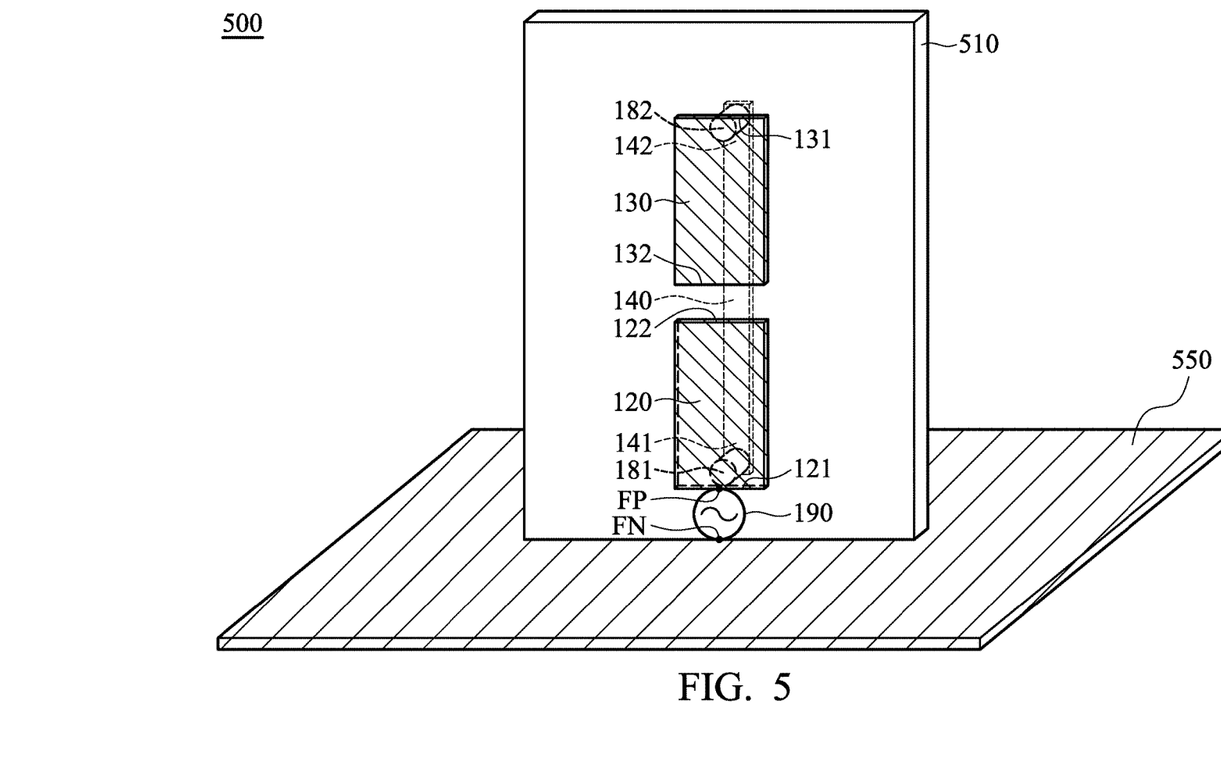
FIG. 5 is a perspective view of an antenna structure according to an embodiment of the invention.

FIG. 5 is a perspective view of an antenna structure 500 according to an embodiment of the invention. FIG. 5 is similar to FIG. 1A, FIG. 1B, and FIG. 1C. The difference between them is that the antenna structure 500 of FIG. 5 merely includes a dielectric substrate 510, the first radiation pattern 120, the second radiation pattern 130, the third radiation pattern 140, and a ground plane 550 (i.e., the embodiment of FIG. 5 removes the fourth radiation element 150, the fifth radiation element 160, and the sixth radiation element 170, but uses the ground plane 550 instead). In the embodiment of FIG. 5, the ground plane 550 is disposed adjacent to the dielectric substrate 510 and is substantially perpendicular to the dielectric substrate 510, and a negative feeding point FN is positioned at the ground plane 550. The ground plane 550 is configured to generate a mirror current of the antenna structure 500, and it serves as the omitted portion of the antenna structure 500 and has a similar function. With such a design, the total size of the antenna structure 500 is reduced to a half of its original size. Other features of the antenna structure 500 of FIG. 5 are similar to those of the antenna structure 100 of FIG. 1A, FIG. 1B, and FIG. 1C. Accordingly, the two embodiments can achieve similar levels of performance.

Figure 6:
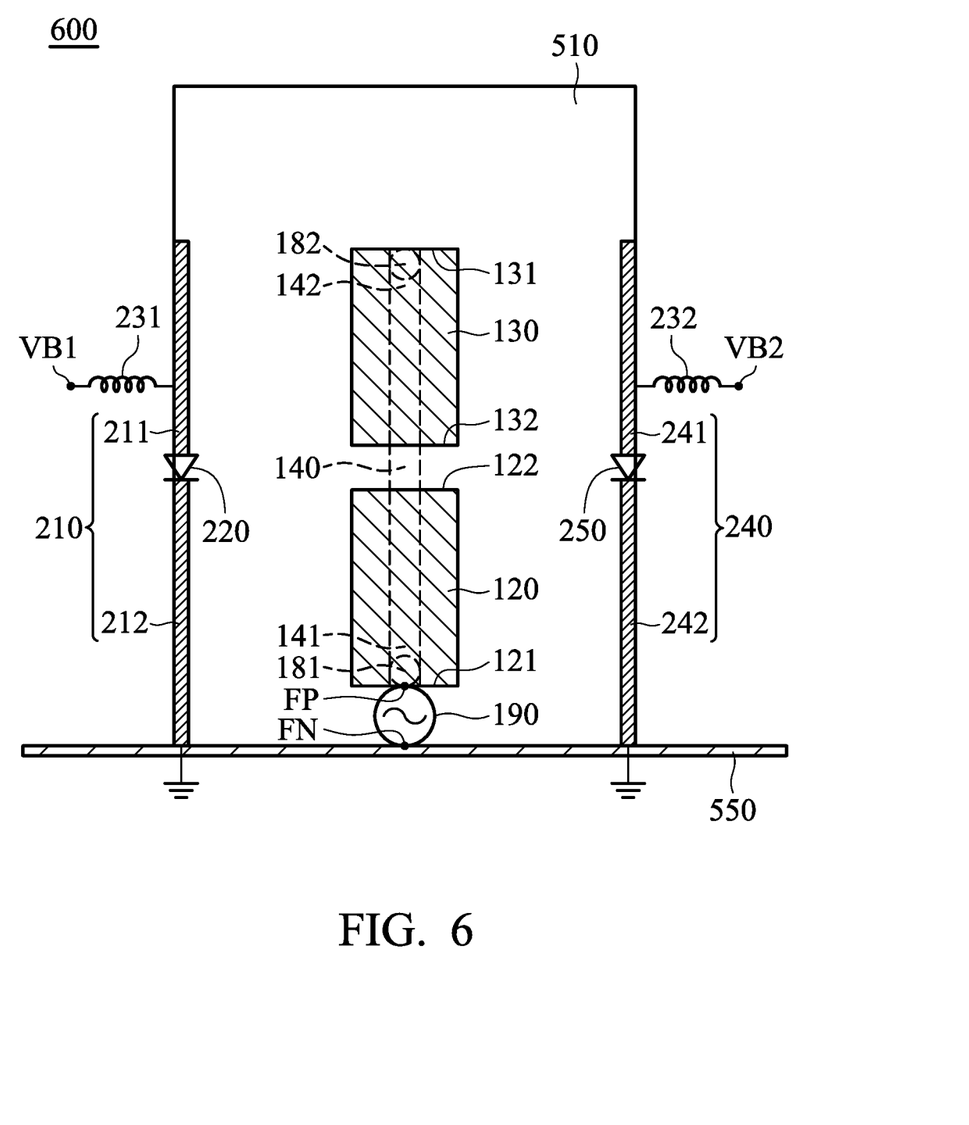
FIG. 6 is a front view of an antenna structure according to an embodiment of the invention.

FIG. 6 is a front view of an antenna structure 600 according to an embodiment of the invention. FIG. 6 is similar to FIG. 2. The difference between them is that the antenna structure 600 of FIG. 6 merely further includes the first reflector 210, the first diode 220, the first inductor 231, the second reflector 240, the second diode 250, and the second inductor 232 (i.e., the embodiment of FIG. 6 removes the third inductor 233 and the fourth inductor 234). The first diode 220 is coupled in series between the first portion 211 and the second portion 212 of the first reflector 210. The first inductor 231 is coupled between the first portion 211 of the first reflector 210 and a first bias voltage VB1. The first diode 220 is selectively turned on or off according to the first bias voltage VB1. For example, when the first bias voltage VB1 has a high voltage level (e.g., +3V), the first diode 220 may be turned on so as to enable the first reflector 210; when the first bias voltage VB1 has a low voltage level (e.g., 0V), the first diode 220 may be turned off so as to disable the first reflector 210. The second diode 250 is coupled in series between the first portion 241 and the second portion 242 of the second reflector 240. The second inductor 232 is coupled between the first portion 241 of the second reflector 240 and a second bias voltage VB2. The second diode 250 is selectively turned on or off according to the second bias voltage VB2. For example, when the second bias voltage VB2 has a high voltage level (e.g., +3V), the second diode 250 may be turned on so as to enable the second reflector 240; when the second bias voltage VB2 has a low voltage level (e.g., 0V), the second diode 250 may be turned off so as to disable the second reflector 240. The second portion 212 of the first reflector 210 and the second portion 242 of the second reflector 240 are both coupled to the ground plane 550. The ground plane 550 is configured to generate a mirror current of the antenna structure 600, and it serves as the omitted portion of the antenna structure 600 and has a similar function. With such a design, the total size of the antenna structure 600 is reduced to a half of its original size. Other features of the antenna structure 600 of FIG. 6 are similar to those of the antenna structure 200 of FIG. 2. Accordingly, the two embodiments can achieve similar levels of performance.

The invention proposes a novel antenna structure. In comparison to a conventional antenna design, the invention has at least the advantages of: (1) having a minimized total size, (2) being easy to mass produce, (3) covering the whole range of WLAN frequency bands, (4) having a low manufacturing cost, and (5) being used together with reflectors and diodes for generating an omnidirectional or directional radiation pattern. Therefore, the proposed antenna structure of the invention is suitable for application in a variety of current small-size mobile communication devices.

Note that the above element sizes, element parameters, element shapes, and frequency ranges are not limitations of the invention. An antenna designer can fine-tune these settings or values according to different requirements. It should be understood that the antenna structure of the invention is not limited to the configurations of FIGS. 1-6. The invention may merely include any one or more features of any one or more embodiments of FIGS. 1-6. In other words, not all of the features displayed in the figures should be implemented in the antenna structure of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An antenna structure, comprising:
    a dielectric substrate, having an upper surface and a lower surface;
    a first radiation element, having a first end and a second end, and disposed on the upper surface of the dielectric substrate, wherein a positive feeding point is positioned at the first end of the first radiation element;
    a second radiation element, having a first end and a second end, and disposed on the upper surface of the dielectric substrate, wherein the second end of the second radiation element faces the second end of the first radiation element;
    a third radiation element, having a first end and a second end, and disposed on the lower surface of the dielectric substrate, wherein the first end of the third radiation element is coupled to the first end of the first radiation element, and the second end of the third radiation element is coupled to the first end of the second radiation element;
    a fourth radiation element, having a first end and a second end, and disposed on the upper surface of the dielectric substrate, wherein a negative feeding point is positioned at the first end of the fourth radiation element;
    a fifth radiation element, having a first end and a second end, and disposed on the upper surface of the dielectric substrate, wherein the second end of the fifth radiation element faces the second end of the fourth radiation element;
    a sixth radiation element, having a first end and a second end, and disposed on the lower surface of the dielectric substrate, wherein the first end of the sixth radiation element is coupled to the first end of the fourth radiation element, and the second end of the sixth radiation element is coupled to the first end of the fifth radiation element;
    a first via element, formed in the dielectric substrate, and coupled between the first end of the first radiation element and the first end of the third radiation element;
    a second via element, formed in the dielectric substrate, and coupled between the first end of the second radiation element and the second end of the third radiation element;
    a third via element, formed in the dielectric substrate, and coupled between the first end of the fourth radiation element and the first end of the sixth radiation element; and
    a fourth via element, formed in the dielectric substrate, and coupled between the first end of the fifth radiation element and the second end of the sixth radiation element.

2. The antenna structure as claimed in claim 1, wherein each of the first radiation element, the second radiation element, the fourth radiation element, and the fifth radiation element substantially has a rectangular shape, wherein each of the third radiation element and the sixth radiation element substantially has a straight-line shape, and wherein a width of the rectangular shape is greater than or equal to a width of the straight-line shape.

3. The antenna structure as claimed in claim 1, wherein the antenna structure covers a low-frequency band from about 2400 MHz to about 2484 MHz, and a high-frequency band from about 5150 MHz to about 5850 MHz.

4. The antenna structure as claimed in claim 3, wherein a length of each of the first radiation element and the fourth radiation element is substantially equal to 0.25 wavelength of the high-frequency band.

5. The antenna structure as claimed in claim 3, wherein a total length of the third radiation element and the second radiation element is substantially equal to 0.25 wavelength of the low-frequency band, and wherein a total length of the sixth radiation element and the fifth radiation element is substantially equal to 0.25 wavelength of the low-frequency band.

6. The antenna structure as claimed in claim 3, further comprising:
    a signal source, having a positive electrode and a negative electrode, and configured to generate an RF (Radio Frequency) signal and a DC (Direct Current) control signal, wherein the positive electrode of the signal source is coupled to the positive feeding point, and the negative electrode of the signal source is coupled to the negative feeding point.

7. The antenna structure as claimed in claim 6, further comprising:
    a first reflector, disposed at a side of the antenna structure, and comprising a first portion and a second portion; and
    a first diode, coupled in series between the first portion and the second portion of the first reflector, wherein the first diode is selectively turned on or off according to the DC control signal.

8. The antenna structure as claimed in claim 7, wherein a total length of the first reflector is greater than or equal to 0.5 wavelength of the high-frequency band.

9. The antenna structure as claimed in claim 7, further comprising:
    a first inductor, coupled between the first portion of the first reflector and a first connection point, wherein the first connection point is positioned at the first radiation element, the second radiation element, or the third radiation element; and
    a second inductor, coupled between the second portion of the first reflector and a second connection point, wherein the second connection point is positioned at the fourth radiation element, the fifth radiation element, or the sixth radiation element.

10. The antenna structure as claimed in claim 6, further comprising:
  a second reflector, disposed at another side of the antenna structure, and comprising a first portion and a second portion; and
  a second diode, coupled in series between the first portion and the second portion of the second reflector, wherein the second diode is selectively turned on or off according to the DC control signal.

11. The antenna structure as claimed in claim 10, wherein a total length of the second reflector is greater than or equal to 0.5 wavelength of the high-frequency band.

12. The antenna structure as claimed in claim 10, further comprising:
  a third inductor, coupled between the first portion of the second reflector and a third connection point, wherein the third connection point is positioned at the first radiation element, the second radiation element, or the third radiation element; and
  a fourth inductor, coupled between the second portion of the second reflector and a fourth connection point, wherein the fourth connection point is positioned at the fourth radiation element, the fifth radiation element, or the sixth radiation element.

13. An antenna structure, comprising:
  a dielectric substrate, having an upper surface and a lower surface;
  a first radiation element, having a first end and a second end, and disposed on the upper surface of the dielectric substrate, wherein a positive feeding point is positioned at the first end of the first radiation element;
  a second radiation element, having a first end and a second end, and disposed on the upper surface of the dielectric substrate, wherein the second end of the second radiation element faces the second end of the first radiation element;
  a third radiation element, having a first end and a second end, and disposed on the lower surface of the dielectric substrate, wherein the first end of the third radiation element is coupled to the first end of the first radiation element, and the second end of the third radiation element is coupled to the first end of the second radiation element;
  a ground plane, disposed adjacent to the dielectric substrate, wherein a negative feeding point is positioned at the ground plane;
  a first via element, formed in the dielectric substrate, and coupled between the first end of the first radiation element and the first end of the third radiation element; and
  a second via element, formed in the dielectric substrate, and coupled between the first end of the second radiation element and the second end of the third radiation element.

14. The antenna structure as claimed in claim 13, wherein the ground plane is configured to generate a mirror current of the antenna structure.

15. The antenna structure as claimed in claim 13, further comprising:
  a first reflector, disposed at a side of the antenna structure, and comprising a first portion and a second portion;
  a first diode, coupled in series between the first portion and the second portion of the first reflector; and
  a first inductor, coupled between the first portion of the first reflector and a first bias voltage, wherein the first diode is selectively turned on or off according to the first bias voltage.

16. The antenna structure as claimed in claim 15, wherein the second portion of the first reflector is coupled to the ground plane.

17. The antenna structure as claimed in claim 13, further comprising:
  a second reflector, disposed at another side of the antenna structure, and comprising a first portion and a second portion;
  a second diode, coupled in series between the first portion and the second portion of the second reflector; and
  a second inductor, coupled between the first portion of the second reflector and a second bias voltage, wherein the second diode is selectively turned on or off according to the second bias voltage.

18. The antenna structure as claimed in claim 17, wherein the second portion of the second reflector is coupled to the ground plane.

* * * * *